USo08862430B2

United States Patent
Nam et al.

(10) Patent No.: US 8,862,430 B2
(45) Date of Patent: Oct. 14, 2014

(54) METHOD OF ESTIMATING POSITION OF MOBILE NODE IN WIRELESS SENSOR NETWORK

(75) Inventors: Yoon Seok Nam, Daejeon (KR); Jae Doo Huh, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1129 days.

(21) Appl. No.: 12/808,394

(22) PCT Filed: Jul. 30, 2008

(86) PCT No.: PCT/KR2008/004440
§ 371 (c)(1),
(2), (4) Date: Jun. 16, 2010

(87) PCT Pub. No.: WO2009/078536
PCT Pub. Date: Jun. 25, 2009

(65) Prior Publication Data
US 2011/0119024 A1     May 19, 2011

(30) Foreign Application Priority Data
Dec. 17, 2007  (KR) .................. 10-2007-0132669
Feb. 22, 2008  (KR) .................. 10-2008-0016139

(51) Int. Cl.
G04F 10/00      (2006.01)
G01S 5/02       (2010.01)
G01S 5/06       (2006.01)

(52) U.S. Cl.
CPC .. *G01S 5/06* (2013.01); *G01S 5/021* (2013.01)
USPC ..... 702/150; 702/149; 455/456.1; 455/456.2; 455/456.3

(58) Field of Classification Search
USPC ....................................... 455/456.01–456.03
See application file for complete search history.

(56) References Cited

U.S. PATENT DOCUMENTS 5,220,332 A *  6/1993  Beckner et al. ............... 342/125
7,289,466 B2 * 10/2007  Kore et al. .................... 370/328
(Continued)

FOREIGN PATENT DOCUMENTS

| EP | 1 763 164 A1 | 3/2007 |
|---|---|---|
| KR | 10-0701351 | 3/2007 |
| KR | 10-2007-0116283 | 12/2007 |
| WO | 2007/020907 | 2/2007 |

OTHER PUBLICATIONS

Jun Luo et al., "Non-Interactive Location Surveying for Sensor Networks with Mobility-Differentiated ToA," INFOCOM 2006, 25th IEEE International Conference on Computer Communications, Apr. 2006, pp. 1-13.

(Continued)

*Primary Examiner* — Jonathan C Teixeira Moffat
*Assistant Examiner* — Hien Vo
(74) *Attorney, Agent, or Firm* — Staas & Halsey LLP

(57) ABSTRACT

There is provided a method for estimating a position of a mobile node in a wireless sensor network. The method includes estimating a frequency offset between anchor nodes and estimating a difference between times when ranging frames from a mobile node are received by two anchor node, without use of a separate synchronization unit, such as a network synchronized clock supply unit that supplies a network synchronized clock via a cable, in a wireless sensor network, unlike a conventional method of estimating Time of Flight (TOF) using Two-Way Ranging (TWR) and Symmetric Double Sided-TWR (SDS-TWR) schemes. The estimated receiving time difference is directly applied to a Time Difference Of Arrival (TDOA) algorithm in order to estimate the position of the mobile node.

10 Claims, 7 Drawing Sheets

(56) References Cited

U.S. PATENT DOCUMENTS

| | | |
|---|---|---|
| 2007/0041352 A1 | 2/2007 | Frankel et al. |
| 2007/0060079 A1 | 3/2007 | Nakagawa et al. |
| 2007/0179782 A1 | 8/2007 | Chung et al. |
| 2007/0200759 A1* | 8/2007 | Heidari-Bateni et al. .... 342/387 |

OTHER PUBLICATIONS

Andy Harter et al., "The Anatomy of a Context-Aware Application," In Wireless Networks, vol. 8, Feb. 2002, 10 pages.

Nissanka Bodhi Priyantha, "The Cricket Indoor Location System," Massachusetts Institute of Technology, Jun. 2005, pp. 1-199.

"Part 15.4:Wireless Medium Access Control (MAC) and Physical Layer (PHY) Specifications for Low-Rate Wireless Personal Area Networks (LR-WPANs): Amendment to add alternate PHY," IEEE Computer Society, IEEE P802.15.4a™/D7, Jan. 2007, 209 pages.

"Ubisense Compact Tag," www.ubisense.net, Ubisense factsheet CT 1.0, 2007, 1 page.

International Search Report for PCT/KR2008/004440, mailed on Dec. 29, 2009.

* cited by examiner

METHOD OF ESTIMATING POSITION OF MOBILE NODE IN WIRELESS SENSOR NETWORK

RELATED APPLICATIONS

This application claims the benefit under 35 U.S.C. Section 371, of PCT International Application No. PCT/KR2008/004440, filed Jul. 30, 2008, which claimed priority of Korean Patent Application No. 10-2007-0132669, filed on Dec. 17, 2007, and No. 10-2008-0016139, filed on Feb. 22, 2008, which are incorporated herein by reference.

TECHNICAL FIELD

The present invention relates to a method for estimating a position of a mobile node in a wireless sensor network, and more particularly, to a method for estimating a position of a mobile node in a wireless sensor network, that is suitable for estimating the position of the mobile node by estimating a ranging frame arrival time and estimating a difference between received ranging frame arrival times of node pairs in the wireless sensor network.

This work was supported by the IT R&D program of MIC/IITA. [2007-S-047-01, Development of HD Class Multimedia System Technology over Wireless Home Network]

BACKGROUND ART

As well known, in a wireless sensor network, positions of a plurality of mobile nodes are estimated using a few anchor nodes and utilized, for example, to track the positions of the mobile nodes and to provide service according to states of the mobile nodes.

In particular, a position estimation algorithm uses an angle and a distance between an anchor node and a mobile node, the intensity of a received signal, and the like. The distance is widely used as the most stable factor, and estimated from Time of Flight (TOF) that is, in turn, estimated using an ultrasonic or wireless signal. Obtaining exact distance information or TOF necessitates synchronization between the anchor node and the mobile node.

When a large-scale wireless network service such as mobile phone service is provided, supply of a network synchronized clock is highly critical for stable operation of a wide area system. The clock is commonly supplied to several anchor nodes, primarily, via a cable. On the other hand, in a temporary or small-scale network such as a sensor network or an ad hoc network, it is non-economic, troublesome, or impossible to install a separate network synchronization unit.

Meanwhile, in order to estimate a position of a mobile node in a conventional wireless sensor network, an Active Bat and Cricket system used a radio signal having a higher propagation speed ($3 \times 10^8$ m/s) for synchronization and an ultrasonic signal having a lower propagation speed (about 340 m/s) for TOF calculation. Ubisense Ltd. supplied a separate wired-network synchronization signal from a control server for calculating a position to anchor nodes using a cable having a certain length.

IEEE802.15.4a suggested Two-Way Ranging (TWR) and Symmetric Double Sided-TWR (SDS-TWR) schemes capable of asynchronously calculating TOF without use of a network synchronized clock.

However, such TWR and SDS-TWR schemes still have an estimation error caused by frequency offsets of nodes, and require three or four times frame transmissions between one mobile node and each of anchor nodes, which increase the number of frames to be transmitted and a position estimation time. Accordingly, the TWR and SDS-TWR schemes are not suitable for serving a plurality of mobile nodes. For these reasons, IEEE802.15.4a suggested utilization of One-Way Ranging (OWR) following network synchronization, but implementation of network synchronization or the use of OWR are remained as development dependencies.

DISCLOSURE OF INVENTION

Technical Problem

It is, therefore, an object of the present invention to provide a method for estimating a position of a mobile node in a wireless sensor network, that is capable of estimating the position of the mobile node from Time Difference Of Arrival (TDOA) by estimating an exact signal arrival time using OWR and estimating a difference between received ranging frame arrival times of node pairs.

Technical Solution

In accordance with an embodiment of the present invention, there is provided a method for estimating a position of a mobile node in a wireless sensor network including a plurality of anchor nodes, the method including: forming anchor-node pairs by using a location server and any one of the anchor nodes as a reference and connecting the other anchor nodes to the one anchor node; calculating each frequency tolerance based on time information and a clock frequency corresponding to each anchor-node pair; calibrating the time information based on the frequency tolerance and a distance between the nodes and calculating a difference between times when ranging frames from the mobile node are received by the nodes; and calculating a difference of distance corresponding to the calculated time difference and applying the difference of distance to Time Difference Of Arrival (TDOA) in order to estimate the position of the mobile node.

Advantageous Effects

The present invention, unlike a conventional method of estimating Time of Flight (TOF) using Two-Way Ranging (TWR) and Symmetric Double Sided-TWR (SDS-TWR) schemes, allows a location server to estimate frequency offsets between anchor nodes by disposing a few anchor nodes in known positions in a wireless sensor network, obtain the difference between the times when ranging frames from a mobile node are received by two anchor nodes from the known distance between the two anchor nodes, and estimate the position of the mobile node by applying a difference of distance corresponding to the difference between the times to the TDOA.

Accordingly, a position estimation in wireless sensor network can be built without use of a separate network synchronization unit such as a cable or an expensive precision local oscillator, which facilitates a build-up of the network, and achieves an exact and fast distance estimation using an OWR scheme and a more exact estimation of the position of the mobile node.

BRIEF DESCRIPTION OF THE DRAWINGS

The above and other objects and features of the present invention will become apparent from the following description of preferred embodiments given in conjunction with the accompanying drawings, in which.

MODE FOR THE INVENTION

A technique gist of the present invention is that a plurality of anchor-node pairs are formed in a wireless sensor network, time information corresponding to each anchor-node pair is stored and managed, frequency tolerance is calculated from a time interval, time information between each anchor-node pair and a mobile node is stored, frequency tolerance is calculated according to the time interval, the frequency tolerance is calibrated with a local calibration time to calculate receiving time information for the mobile node signal, and a difference of distance is calculated from the receiving time information, which is repeatedly performed on the respective anchor-node pairs to estimate the position of the mobile node. This can solve problems with conventional techniques.

Hereinafter, preferred embodiments of the present invention will be described in detail with reference to the accompanying drawings so that they can be readily implemented by those skilled in the art.

Figure 1:
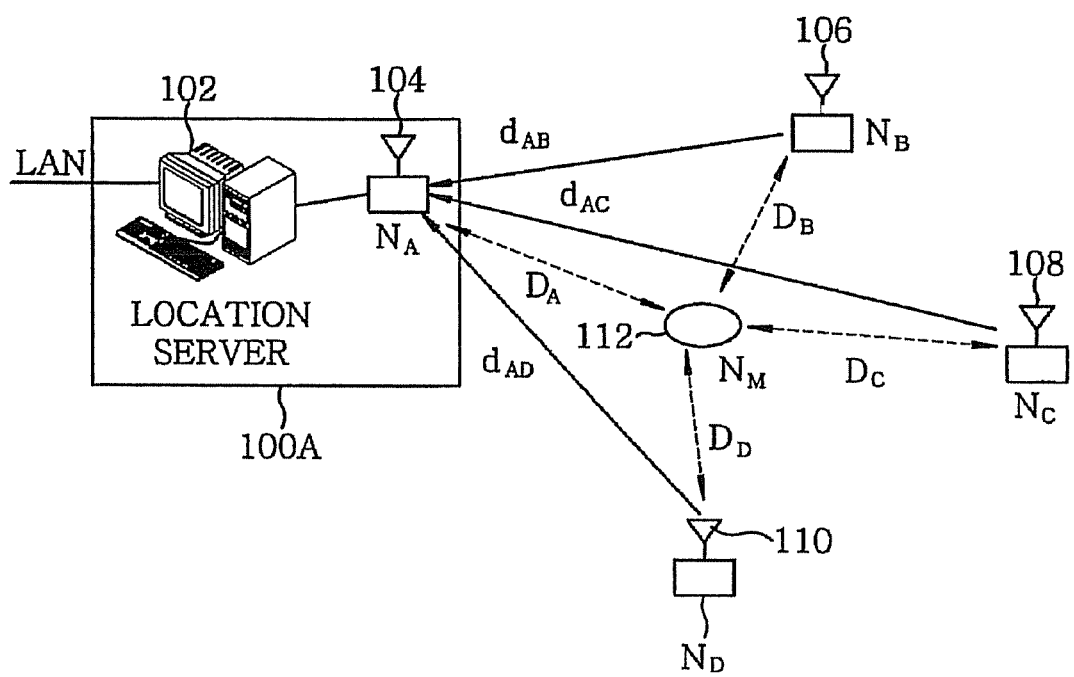
FIG. 1 is a block diagram illustrating a wireless sensor network suitable for estimating a position of a mobile node using node frequency offsets and a ranging frame arrival time difference according to a preferred embodiment of the present invention.

FIG. 1 is a block diagram illustrating a wireless sensor network suitable for estimating a position of a mobile node using node frequency offsets and a ranging frame arrival time difference according to a preferred embodiment of the present invention. The wireless sensor network includes a location server 102, a plurality of anchor nodes $N_A$ 104, $N_B$ 106, $N_C$ 108, and $N_D$ 110, and a mobile node $N_M$ 112.

Here, the position may be estimated and calculated by a mobile node, for example, in a GPS or a Cricket system or by a network, for example, in an Active Bat or a mobile phone. When the position is calculated by the mobile node, position information of the mobile node can be protected. However, the mobile node is required to have a powerful processing capability of a processor for position calculation. Accordingly, a terminal equipment of the mobile node is costly and needs a large-sized terminal screen, which makes portability or attachment difficult. When the position is calculated by the network, a terminal equipment can be implemented at very low cost and the network can provide service according to a current status of the mobile node. However, since the position information of the mobile node is managed by the network, the position information may leak unintentionally. In particular, a wireless sensor network necessitates anchor nodes and mobile nodes consuming a very low power and being inexpensive, and needs to manage the position of the mobile nodes, for example, for article check. Accordingly, it is assumed in this disclosure that the position is estimated and calculated by a network.

Referring to FIG. 1, the location server 102 and the anchor node $N_A$ 104 connected to the location server 102 are generally configured as one separate device 100a, which, for example, performs complex calculation using the location server 102 and serves as a sensor network gateway via, for example, a local area network (LAN).

The location server 102 knows the positions of the plurality of anchor nodes 104, 106, 108, and 110. Information on time when ranging frame from the mobile node 112 is received by each of the anchor nodes is provided to the location server 102 via the anchor node $N_A$ 104, which is connected to the location server 102. The location server 102 calculates the position of the mobile node using an algorithm, such as TDOA.

The plurality of anchor nodes 104, 106, 108, and 110 transmit the information on times when they receive the ranging frames from the mobile node 112, to the location server 102 via the anchor node $N_A$ 104, which is connected to the location server 102. A higher-dimensional position coordinate, such as a three dimensional position coordinate, and a wider service range necessitate an increasing number of anchor nodes. Here, there is no reference for indicating a relative time when any one of the anchor nodes 104, 106, 108, and 110 receives a ranging frame from the mobile node. In the present invention, it is possible to obtain information on a difference between times when ranging frames from the mobile node 112 are received by two of the anchor nodes, by synchronizing anchor-node pairs with each other. The anchor-node pairs include anchor node $N_B$ 106-anchor node $N_A$ 104-location server 102, anchor node $N_C$ 108-anchor node $N_A$ 104-location server 102, anchor node $N_D$ 110-anchor node $N_A$ 104-location server 102, etc.

That is, the anchor node $N_A$ 104 connected to the location server 102 is used as a reference node and another anchor node (e.g., any one of the anchor node $N_B$ 106, the anchor node $N_C$ 108, and the anchor node $N_D$ 110) is connected to the anchor node $N_A$ 104, resulting in the anchor-node pair. Here, the anchor node $N_A$ 104 may be selected as a reference anchor node for calculating the position of the mobile node 112.

Meanwhile, the mobile node 112 transmits a ranging frame periodically or aperiodically. Thus, in the wireless sensor network as shown in FIG. 1, the mobile node 112 transmits a ranging frame, and the anchor nodes 104, 106, 108, and 110 transmit information on frame receiving times to the location server 102, such that the position of the mobile node 112 is calculated.

Figure 2:
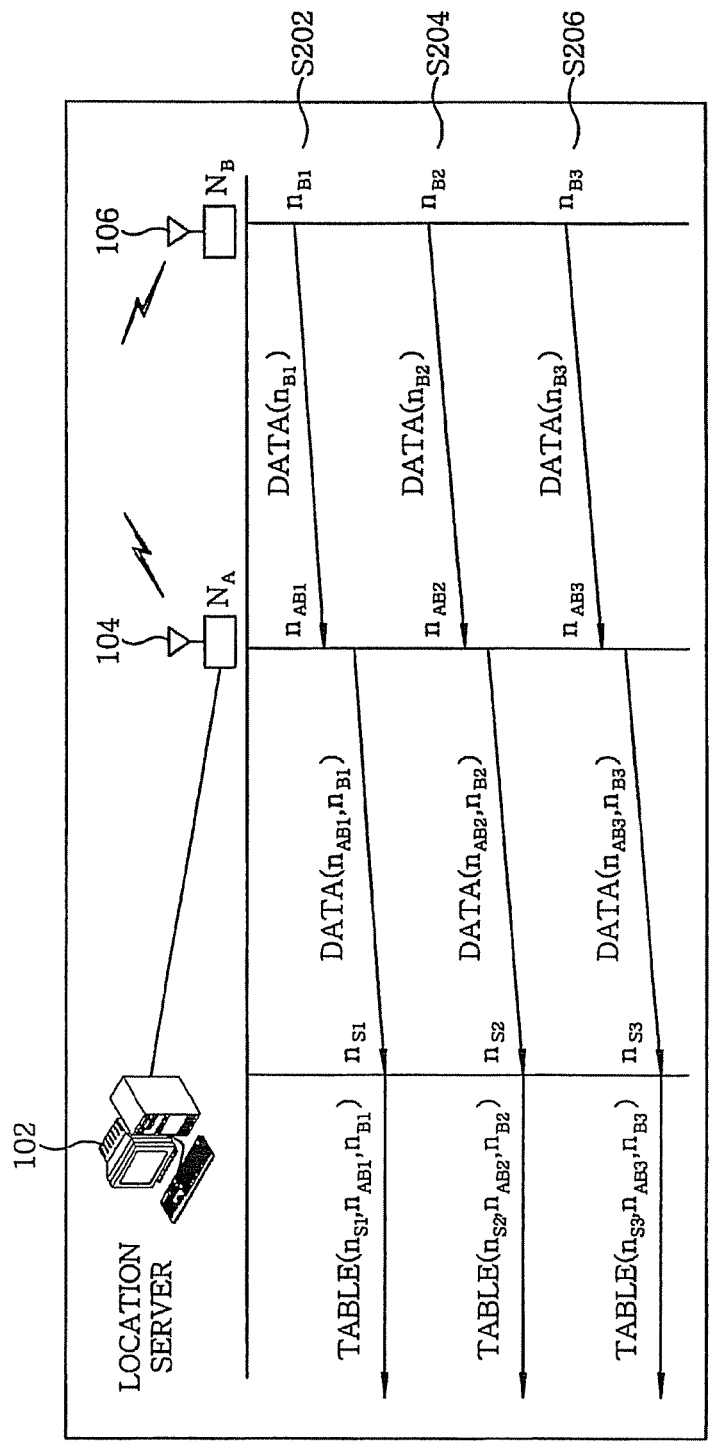
FIG. 2 illustrates a process of transmitting time information for calculating a frequency offset according to the present invention.

FIG. 2 illustrates a process of transmitting time information for calculating a frequency offset according to the present invention.

An algorithm of calculating a frequency offset for local clocks of anchor node $N_B$ 106 and anchor node $N_A$ 104 from the anchor node $N_B$ 106-anchor node $N_A$ 104-location server 102 pair that sends time information in the wireless sensor network of FIG. 1 will now be described with reference to FIG. 2. In most cases, a frequency offset between different systems is not very critical. However, in TOF-based distance and position estimations, a distance error caused by frequency tolerance may increase because TOF multiplied by light velocity ($3 \times 10^8$ m/s) becomes the distance. By estimating the frequency offset between systems, it is possible to reduce a distance and position estimation error.

A time is represented by the anchor-node pair as shown in FIG. 2 in order to match time intervals between frame transmission events and between frame reception events occurring at the nodes. Since the time information is generated based on a local clock, it may be represented by a counter value indicating a time. In a flow S202 of time information transmitted at a certain time, time information $n_{B1}$ of anchor node $N_B$ 106 is transmitted along with the time information $n_{A1}$ of anchor node $N_A$ 104 to the location server 102, and the location server 102 may manage the time information along with its own clock-based time information $n_{S1}$ in the form of, for example, a table.

In another time information flow S204 by a subsequent event, the time information $n_{B2}$ of anchor node $N_B$ 106 is transmitted along with the time information $n_{A2}$ of anchor node $N_A$ 104 to the location server 102, and the location server 102 may manage the time information along with its own clock-based time information $n_{S2}$ in the form of, for example, a table. Likewise, the time information may be continuously transmitted, for example, in a time information flow S206.

Meanwhile, assuming $f_S$, $f_A$, and $f_B$ are clock frequencies for use in the location server 102, the anchor node $N_A$ 104, and the anchor node $N_B$ 106, respectively, $f_R$ is a network synchronization frequency used as a reference for providing exact timing, and $f_A$ and $f_B$ have a slight tolerance from the reference clock frequency, the respective clock frequencies may be expressed by following Equation 1:

$$f_S = f_R(1+e_S)$$

$$f_A = f_R(1+e_A)$$

$$f_B = f_R(1+e_B) \quad \text{Equation 1}$$

where $e_S$, $e_A$ and $e_B$ denote frequency offsets of the local clocks in part per million (ppm), which correspond to the location server 102, the anchor node $N_A$ 104, and the anchor node $N_B$ 106, respectively.

A time interval is represented by a difference between results of a clock counter value multiplied by one clock period in which time information is received. Accordingly, if the time difference (i.e., a time interval) is defined as t2−t1 for convenience, it may be expressed by Equation 2:

$$t_2 - t_1 = \frac{1}{f_S}(n_{S2} - n_{S1}) = \frac{n_S}{f_S}$$

$$t_2 - t_1 = \frac{1}{f_A}(n_{A2} - n_{A1}) = \frac{n_A}{f_A}$$

$$t_2 - t_1 = \frac{1}{f_B}(n_{B2} - n_{B1}) = \frac{n_B}{f_B} \quad \text{Equation 2}$$

Using the reference frequency, the time difference (i.e., time interval) may also be expressed by Equation 3:

$$t_2 - t_1 = \frac{1}{f_R}(n_{R2} - n_{R1}) = \frac{n_R}{f_R} \quad \text{Equation 3}$$

where $n_S$, $n_A$, $n_B$, and $n_R$ denote differences between a counter value by the respective local clocks and a counter value by the reference frequency clock for the same time interval.

The above relationship results in Equation 4:

$$\frac{n_R}{f_R} = \frac{n_S}{f_S} = \frac{n_A}{f_A} = \frac{n_B}{f_B} \quad \text{Equation 4}$$

$$n_R = \frac{n_S}{1+e_S} = \frac{n_A}{1+e_A} = \frac{n_B}{1+e_B}$$

Here, if any one of $e_S$, $e_A$ and $e_B$ is known, the other frequency offsets can be derived. If the local clock frequency $f_A$ or $f_B$ for the anchor node is higher than the network synchronization reference frequency $f_R$, the frequency tolerance $e_A$ or $e_B$ has a positive value (+), and if the local clock frequency $f_A$ or $f_B$ for the anchor node is lower than network synchronization reference frequency, the frequency tolerance $e_A$ or $e_B$ has a negative value (−).

If the frequency offset from the reference frequency for the location server or any one of the anchor nodes is known as described above, the frequency tolerances $e_A$, $e_B$, $e_C$, and $e_D$ of the respective anchor nodes may be calculated from the anchor node $N_B$ 106-anchor node $N_A$ 104-location server 102 pair, the anchor node $N_C$ 108-anchor node $N_A$ 104-location server 102 pair, and the anchor node $N_D$ 110-anchor node $N_A$ 104-location server 102 pair in the wireless sensor network as shown in FIG. 1 by continuously transmitting the time information of the wireless nodes.

For example, a low-speed Wireless Personal Area Network (WPAN) standard, IEEE802.15.4a, having a ranging function uses 64 GHz as a sampling clock frequency, and indicates frame transmitting and receiving times in 32 bits based on the clock. To indicate the frame transmitting and receiving times, transmitting and receiving times of a ranging bit of a frame are used as a reference, resulting in an exact occurrence time of frame transmitting and receiving events.

Figure 3:
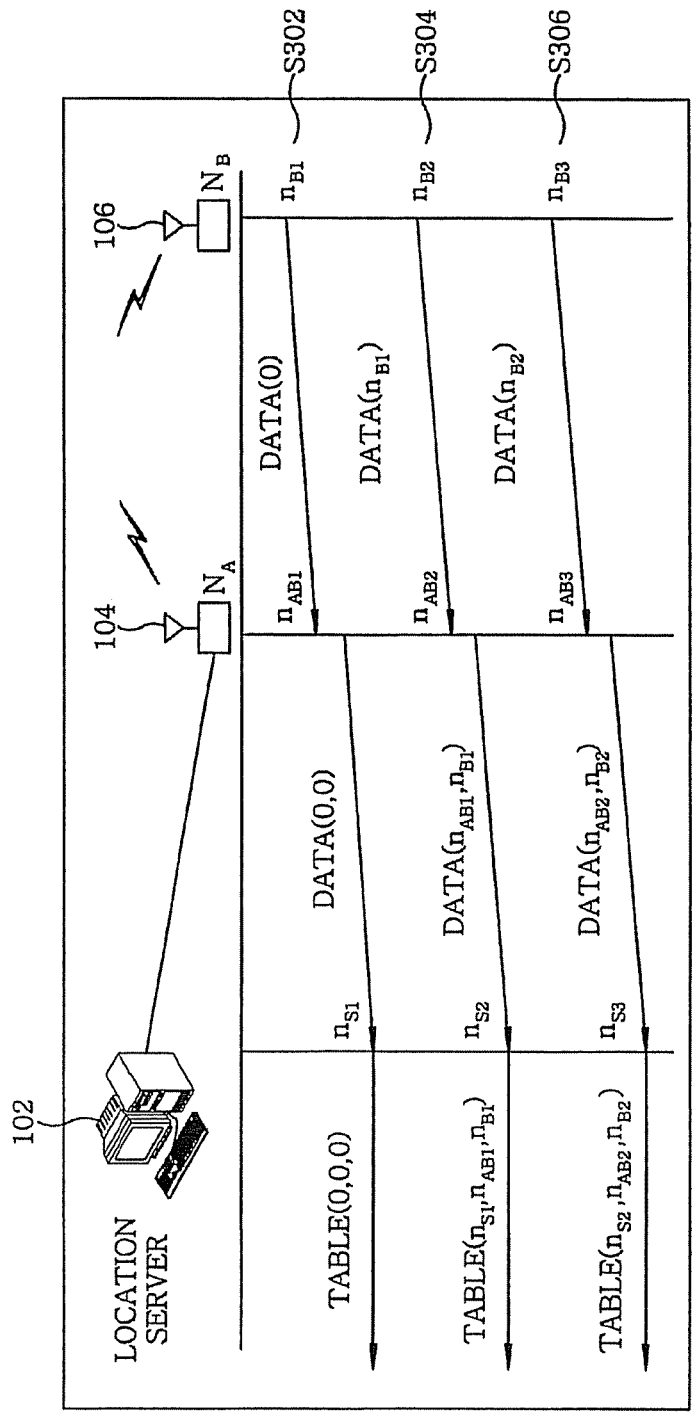
FIG. 3 illustrates a process of transmitting time information for calculating a frequency offset reflecting delayed transmission of time information according to the present invention.

FIG. 3 illustrates a process of transmitting time information for calculating a frequency offset reflecting delayed transmission of time information according to the present invention.

The process of transmitting time information for calculating a frequency offset according to the IEEE802.15.4a standard will now be described with reference to FIG. 3. In a wireless sensor network according to the IEEE802.15.4a standard, a counter value corresponding to an exact frame transmitting time is equal to a value of a time when a specific bit of the frame is transmitted via a wireless antenna of a device, and can be obtained from following frame transmission.

On the other hand, a counter value corresponding to a frame receiving time is equal to a value of a time when the specific bit of the frame is received via the receiving antenna, and can be obtained as soon as frame reception is perceived.

Accordingly, the frequency offset may be estimated from the counter values of a time information flow S302 and a time information flow S304. The counter values corresponding to the frame transmitting time and the frame receiving time may be transmitted upon a next frame transmission event in the transmission process as shown in FIG. 2, which facilitates batch processing of time information.

Figure 4:
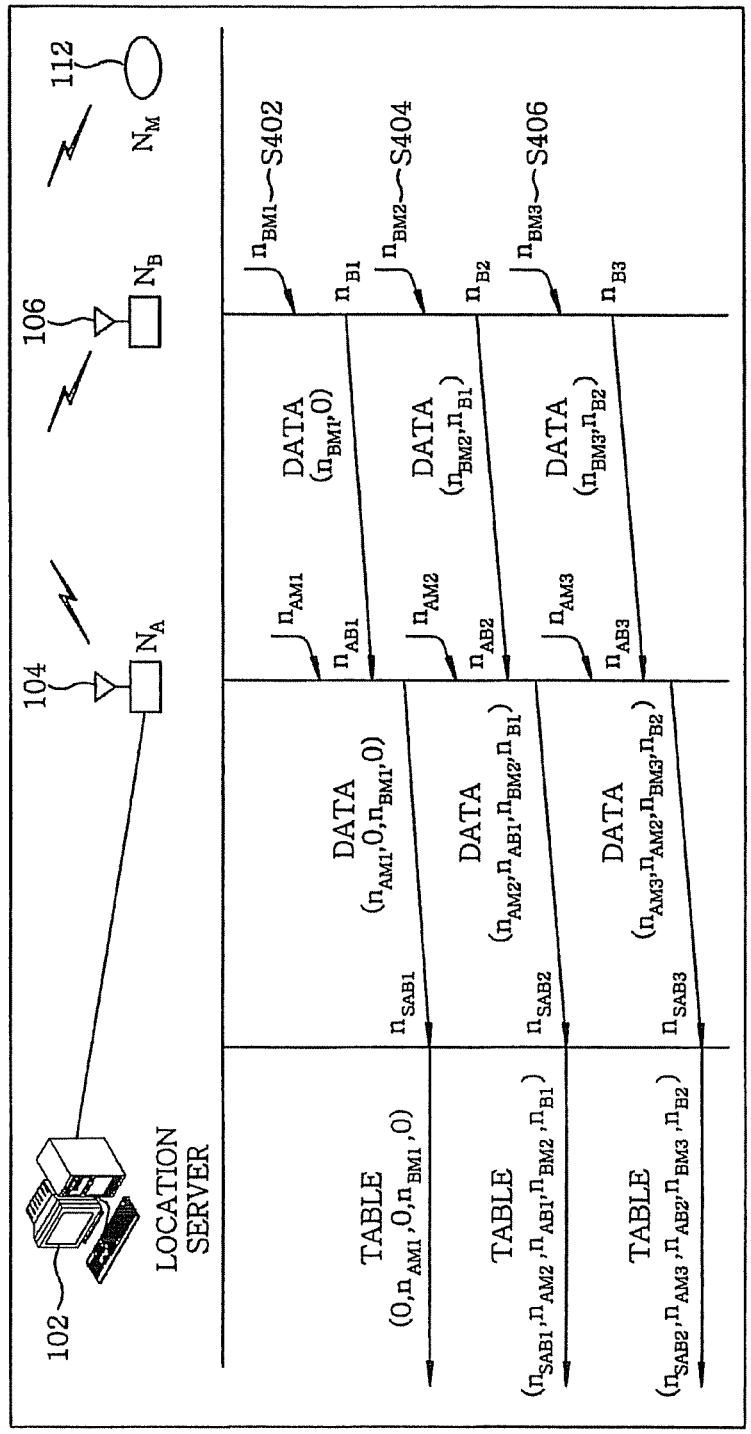
FIG. 4 illustrates a process of transmitting time information for estimating a difference between times when ranging frames from a mobile node are received by two anchor nodes $N_A$ and $N_B$ according to the present invention.

FIG. 4 illustrates a process of transmitting time information for estimating a difference between times when two anchor nodes $N_A$ and $N_B$ receive ranging frames from a mobile node according to the present invention.

A process of transmitting time information for obtaining the difference between the times when ranging frames of mobile node $N_M$ 112 are received by two anchor nodes $N_A$ 104 and $N_B$ 106, respectively, in the mobile node $N_M$ 112-anchor node $N_B$ 106-anchor node $N_A$ 104-location server 102 pair that transmits the time information, will now be described with reference to FIG. 4. A flow S402 of time information transmitted by the mobile node $N_M$ 112-anchor node $N_B$ 106-anchor node $N_A$ 104-location server 102 pair at a certain time is a first time information transmission for initialization. The time information flow S402 is indicated by local clock-based times $n_{AM1}$ and $n_{BM1}$ when ranging frames from mobile node $N_M$ 112 are received by anchor node $N_A$ 104 and anchor node $N_B$ 106, respectively.

The anchor node $N_B$ 106 stores a frame transmitting time $n_{B1}$, for a subsequent event, while transmitting time information $n_{BM1}$ to anchor node $N_A$ 104. The anchor node $N_A$ 104 stores a receiving time $n_{AB1}$ when the frame is received from anchor node $N_B$ 106, for a subsequent event, and transmits the time information $n_{BM1}$ and $n_{AM1}$ to the location server 102. The location server 102 stores a receiving time $n_{SAB1}$ when this frame is received, for a subsequent event.

Another time information flow S404 is indicated by local clock-based times $n_{AM2}$ and $n_{BM2}$ when ranging frames from mobile node $N_M$ 112 are received by anchor node $N_A$ 104 and anchor node $N_B$ 106, respectively.

The anchor node $N_B$ 106 stores the frame transmitting time $n_{B2}$, for a subsequent event, while transmitting the time information $n_{BM2}$ and time information $n_{B1}$ which is about the most recent time when the anchor node $N_B$ transmitted information to the anchor node $N_A$ 104, to the anchor node $N_A$ 104. The anchor node $N_A$ 104 stores receiving time $n_{AB2}$ when the frame is received from the anchor node $N_B$ 106, for a subsequent event, and transmits the above time information '$n_{AM2}$, $n_{BM2}$, $n_{AB1}$, and $n_{B1}$' to the location server 102. The location server 102 stores a time $n_{SAB2}$ when this frame is received, for a subsequent event, and manages data of the '$n_{SAB1}$, $n_{AM2}$, $n_{BM2}$, $n_{AB1}$, and $n_{B1}$' pair.

Meanwhile, yet another time information flow S406 is processed in the same order as described above, in which the location server 102 manages data of the '$n_{SAB2}$, $n_{AM3}$, $n_{BM3}$, $n_{AB2}$, and $n_{B2}$' pair.

Relationships shown in following Equation 5 among the frequency tolerances $e_S$, $e_A$ and $e_B$ of the location server 102, anchor nodes $N_A$ 104, and anchor node $N_B$ 106 are obtained from the time information flows S404 and S406.

$$f_S = f_R(1 + e_S) \quad \text{Equation 5}$$
$$f_A = f_R(1 + e_A)$$
$$f_B = f_R(1 + e_B)$$
$$t_2 - t_1 = \frac{1}{f_S}(n_{SAB2} - n_{SAB1}) = \frac{n_S}{f_S}$$
$$t_2 - t_1 = \frac{1}{f_A}(n_{AB2} - n_{AB1}) = \frac{n_A}{f_A}$$
$$t_2 - t_1 = \frac{1}{f_A}(n_{AB2} - n_{AB1}) = \frac{n_B}{f_B}$$
$$\frac{n_S}{1 + e_S} = \frac{n_A}{1 + e_A} = \frac{n_B}{1 + e_B}$$

If any one of the frequency tolerance $e_S$, $e_A$ and $e_B$ is known, other error values can be obtained from Equation 5.

A difference between times when the ranging frames from mobile node $N_M$ 112 are received by anchor node $N_A$ 104 and anchor node $N_B$ 106 may also be calculated. The distance between anchor node $N_A$ 104 and anchor node $N_B$ 106 is known as $d_{AB}$, as shown in FIG. 1, and by considering TOF according to the distance, $n_{AB2}$ can be calibrated with a local calibration time (i.e., a local time) using $n_{B2}$ as a reference and adopted as the value with same reference time for anchor node $N_A$ 104 and anchor node $N_B$ 106. That is, $n_{ma1}$ and $n_{mb1}$ in Equations 6 and 7 are calibrated counter values and indicate the same time, although they may take different values in Equations 6 and 7, respectively:

$$n_{ma1} = n_{AB2} - \frac{d_{AB}(m)}{c(m/\text{sec})} \times f_R \quad \text{Equation 6}$$
$$n_{mb1} = n_{B2}$$

$$n_{ma1} = n_{AB2} \quad \text{Equation 7}$$
$$n_{mb1} = n_{B2} + \frac{d_{AB}(m)}{c(m/\text{sec})} \times f_B$$

Meanwhile, the time taken to receive the ranging frame from the mobile node may be calculated from Equation 6 or 7. Here, the time taken to receive the ranging frame from the mobile node is calculated from Equation 6 using counter value of the most recent local calibration time as a reference to calculate receiving time information $n_{AM3}$ and $n_{BM3}$ as shown in Equation 8:

$$n_{ma2} = \frac{n_{AM3} - n_{ma1}}{1 + e_A} \quad \text{Equation 8}$$
$$= \frac{n_{AM3} - n_{A2} + \frac{d_{AB}}{c} \times (1 + e_A) \times f_R}{1 + e_A}$$

$$n_{mb2} = \frac{n_{BM3} - n_{mb1}}{1 + e_B}$$
$$= \frac{n_{BM3} - n_{B2}}{1 + e_B}$$

That is, a difference between times taken to receive the ranging frame from the mobile node may be estimated and calculated from time information of each anchor-node pair, frequency tolerance calculated from the time information, and a distance between two nodes. The estimation may be made by applying the frequency tolerance to the local time of each anchor-node pair to synchronize the local time with a reference frequency-based time.

A difference of distance corresponding to the difference between times when the ranging frames from the mobile node $N_M$ 112 are received by two anchor nodes $N_A$ 104 and $N_B$ 106, respectively, is expressed by Equation 9:

$$D_{BA} = D_B - D_A \quad \text{Equation 9}$$
$$= (n_{mb2} - n_{ma2}) \times \frac{c}{f_R}$$
$$= \left( \frac{n_{BM3} - n_{B2}}{1 + e_B} - \frac{n_{AM3} - n_{AB2} + \frac{d_{AB}}{c} \times (1 + e_A) \times f_R}{1 + e_A} \right) \times \frac{c}{f_R}$$

In FIG. 4, the flows S402, S404, and S406 are to transmit the information on the times when the anchor nodes receive the ranging frames from the mobile node, and information on the time when a ranging frame is transmitted in a flow immediately before this receiving event occurs, which may not necessarily result from processing for the same mobile node, that is, may result from flow processing for other mobile nodes or normal transmission processing between the anchor nodes.

Figure 5:
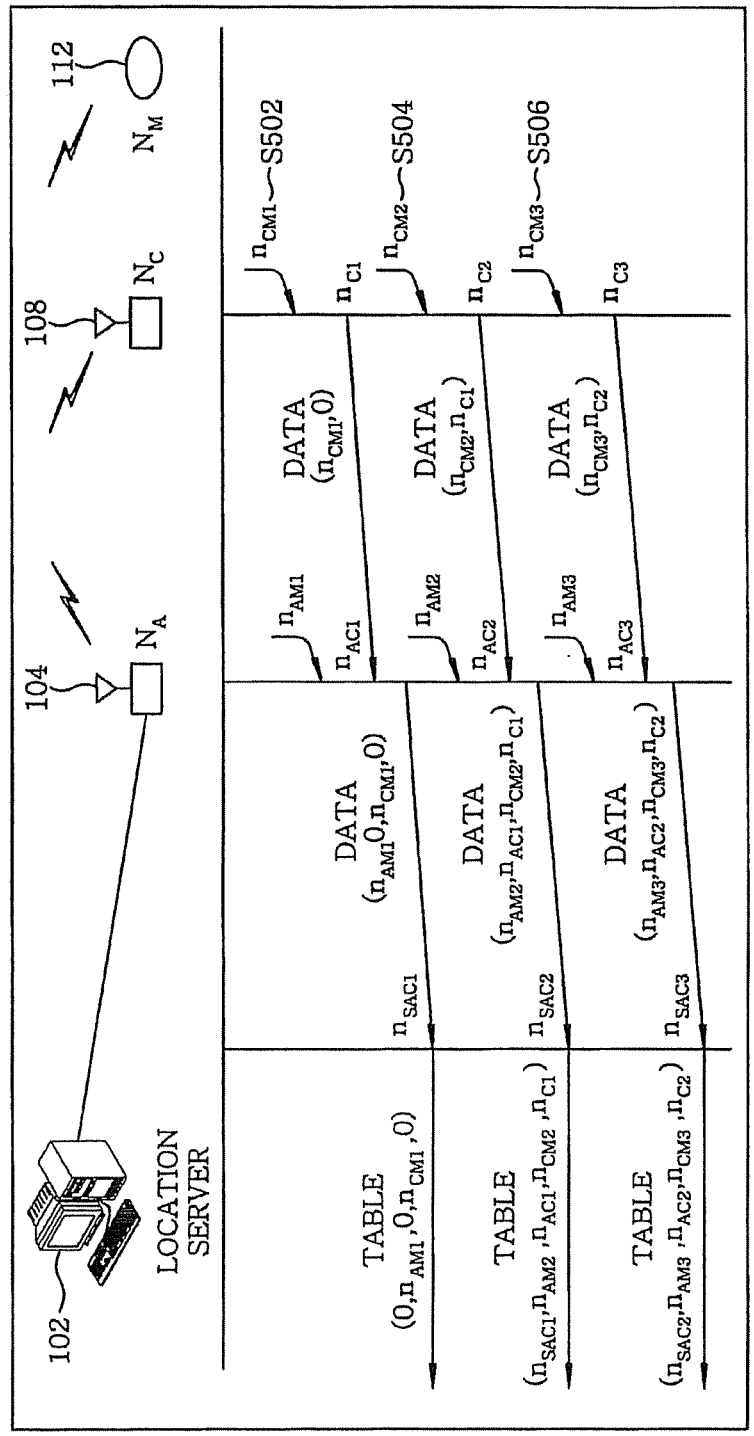
FIG. 5 illustrates a process of transmitting time information for estimating a difference between times when ranging frames from a mobile node are received by two anchor node $N_A$ and $N_C$ according to the present invention.

FIG. 5 illustrates a process of transmitting time information for estimating a difference between times when ranging frames from a mobile node are received by two anchor node $N_A$ and $N_C$, respectively, according to the present invention.

Referring to FIG. 5, the difference of distance corresponding to the difference between the times when the ranging frames from mobile node $N_M$ 112 are received by two anchor node $N_A$ 104 and $N_C$ 108 through the process as described above from the mobile node $N_M$ 112-anchor node $N_C$ 108-anchor node $N_A$ 104-location server 102 pair may be obtained from Equation 10:

$$D_{CA} = D_C - D_A \qquad \text{Equation 10}$$

$$= \left( \frac{n_{CM3} - n_{C2}}{1 + e_C} - \frac{n_{AM3} - n_{AC2} + \frac{d_{AC}}{c} \times (1 + e_A) \times f_R}{1 + e_A} \right) \times \frac{c}{f_R}$$

Figure 6:
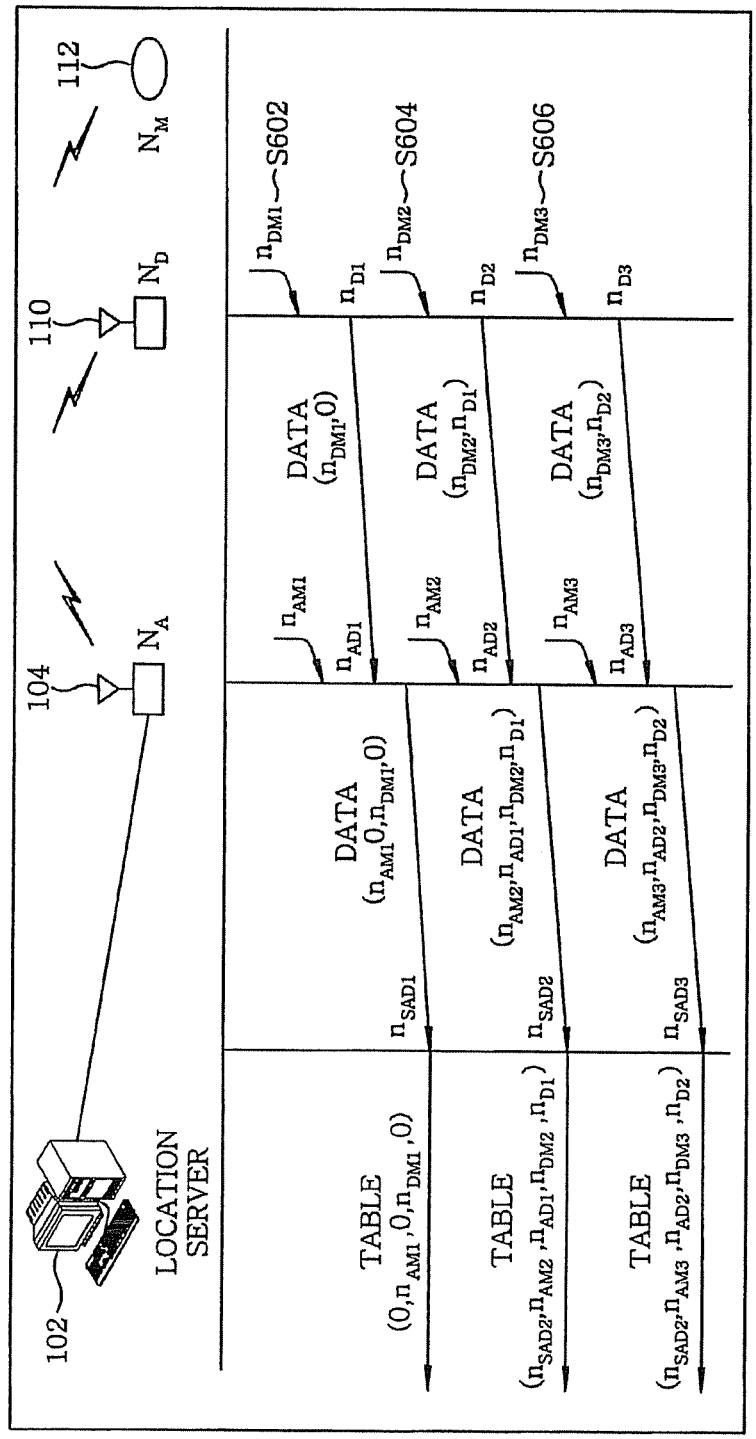
FIG. 6 illustrates a process of transmitting time information for estimating a difference between times when ranging frames from a mobile node are received by two anchor nodes $N_A$ and $N_D$ according to the present invention.

FIG. 6 illustrates a process of transmitting time information for estimating a time difference between times when ranging frames from a mobile node are received by two anchor nodes $N_A$ and $N_D$, respectively, according to the present invention.

Referring to FIG. 6, the difference of distance corresponding to the difference between the times when the ranging frames from mobile node $N_M$ 112 are received by two anchor nodes $N_A$ 104 and $N_D$ 110 through the process as described above from the mobile node $N_M$ 112-anchor node $N_D$ 110-anchor node $N_A$ 104-location server 102 pair may be calculated from Equation 11:

$$D_{DA} = D_D - D_A \qquad \text{Equation 11}$$

$$= \left( \frac{n_{DM3} - n_{D2}}{1 + e_D} - \frac{n_{AM3} - n_{AD2} + \frac{d_{AD}}{c} \times (1 + e_A) \times f_R}{1 + e_A} \right) \times \frac{c}{f_R}$$

By obtaining $D_{BA} = D_B - D_A$, $D_{CA} = D_C - D_A$, and $D_{DA} = D_D - D_A$ from the relationship among the mobile node $N_M$ 112-anchor node $N_B$ 106-anchor node $N_A$ 104-location server 102 pair, the mobile node $N_M$ 112-anchor node $N_C$ 108-anchor node $N_A$ 104-location server 102 pair, and the mobile node $N_M$ 112-anchor node $N_D$ 110-anchor node $N_A$ 104-location server 102 pair shown in FIG. 1 through the calculation process described above with reference to FIGS. 2 to 6, it is possible to estimate the position of the mobile node $N_M$ 112 using Time Difference Of Arrival (TDOA). When more anchor nodes exist, it is possible to estimate the position of the mobile node using the TDOA by obtaining each difference between distances from the node pairs, with the same process described above.

Next, In the wireless sensor network having the above-described configuration, a process of estimating the position of the mobile node by repeatedly performing on each anchor-node pair by forming a plurality of anchor-node pairs, storing and managing time information corresponding to each anchor-node pair, calculating frequency tolerance based on the time interval, storing time information between each anchor-node pair and mobile node, calculating frequency tolerance based on the time interval, calibrating the frequency tolerance with a local calibration time to calculate receiving time information for the mobile node ranging frame, and calculating a difference of distance from the receiving time information will now be described.

Figure 7:
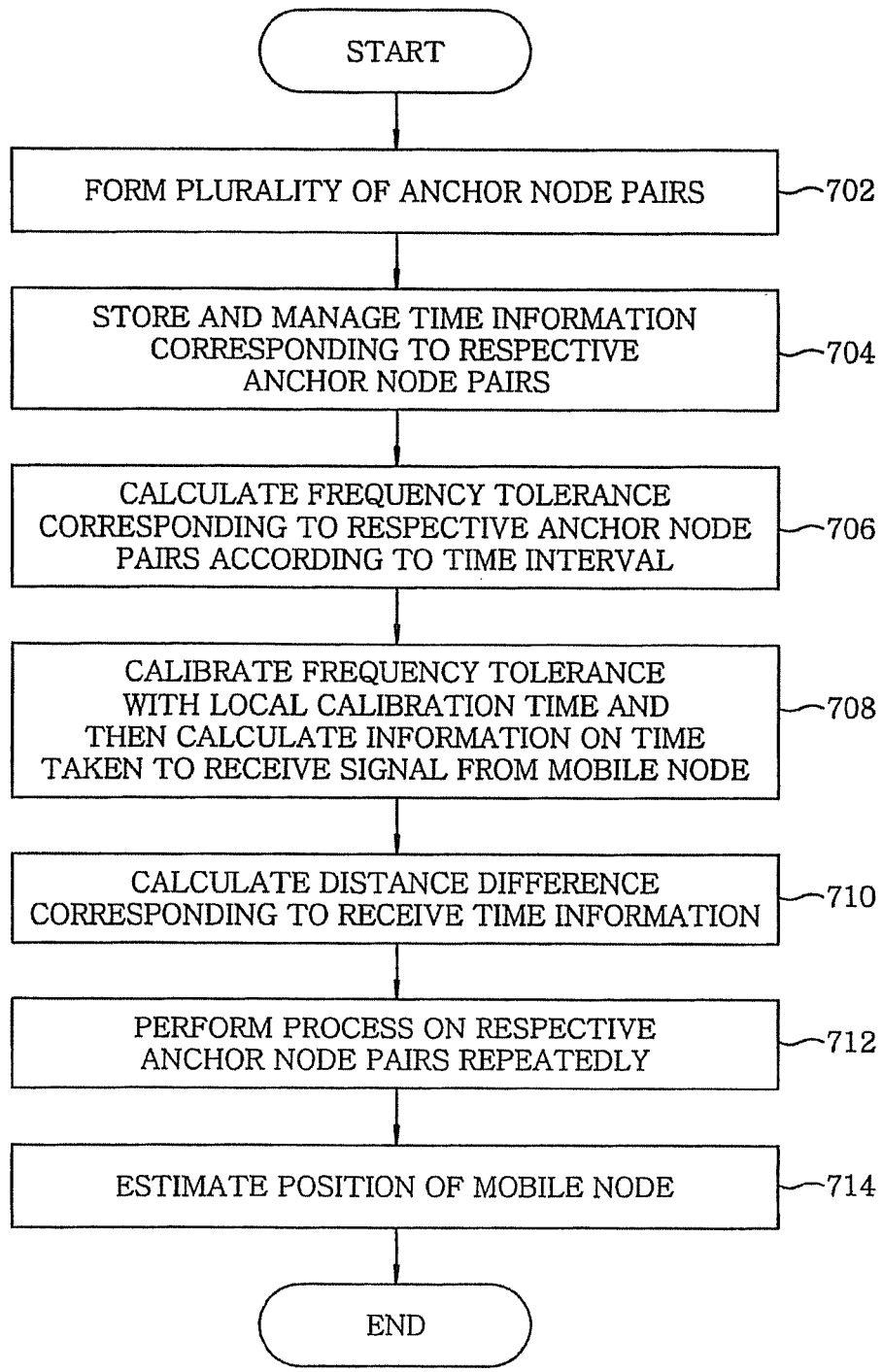
FIG. 7 is a flow chart illustrating a process of estimating a position of a mobile node by estimating a ranging frame arrival time and a received ranging frame arrival time difference according to an embodiment of the present invention.

FIG. 7 is a flow chart illustrating a process of estimating a position of a mobile node by estimating a ranging frame arrival time and a received ranging frame arrival time difference according to an embodiment of the present invention.

In a wireless sensor network including, for example, a location server 102, a plurality of anchor nodes $N_A$ 104, $N_B$ 106, $N_C$ 108, and $N_D$ 110, and a mobile node $N_M$ 112, anchor-node pairs are formed as anchor node $N_B$ 106-anchor node $N_A$ 104-location server 102, anchor node $N_C$ 108-anchor node $N_A$ 104-location server 102, and anchor node $N_D$ 110-anchor node $N_A$ 104-location server 102 (step 702).

In a flow S202 of time information transmitted at a certain time in the anchor-node pair of anchor node $N_B$ 106-anchor node $N_A$ 104-location server 102 as shown in FIG. 2, time information nB1 of anchor node $N_B$ 106 is transmitted to the location server 102 along with the time information $n_{A1}$ of anchor node $N_A$ 104, and the location server 102 stores and manages the time information along with its own clock-based time information $n_{S1}$ in the form of, for example, a table. In another time information flow S204 resulted from a subsequent event, time information $n_{B2}$ of anchor node $N_B$ 106 is transmitted to the location server 102 along with time information $n_{A2}$ of anchor node $N_A$ 104, and the location server 102 stores and manages the time information along with its own clock-based time information $n_{S2}$ in the form of, for example, a table. Likewise, in yet another time information flow S206, the time information of other anchor-node pairs are stored and managed in a manner that managing the time information continuously (step 704).

Also, the respective clock frequencies for use in the location server 102, anchor node $N_A$ 104, and anchor node $N_B$ 106 may be expressed by Equation 1, and the time interval may be represented by a difference between results of a clock counter value multiplied by one clock period, resulting in Equation 2. Using the reference frequency, the time difference (i.e., time interval) may be expressed by Equation 3.

A frequency tolerance corresponding to the time information flow as shown in FIG. 4 is calculated using Equation 5 based on the reference clock of the location server 102 with respect to anchor node $N_A$ 104 and anchor node $N_B$ 106 having the relationship as shown in Equation 4 according to the clock frequency condition ($f_S = f_R$) (step 706). Here, a larger time interval may result in more exactly estimated frequency tolerance. If the local clock frequency $f_A$ or $f_B$ of the anchor node is higher than the network synchronization reference frequency $f_R$, the frequency tolerance $e_A$ or $e_B$ has a positive value (+). If the local clock frequency $f_A$ or $f_B$ of the anchor node is lower than the network synchronization reference frequency $f_R$, the frequency tolerance $e_A$ or $e_B$ has a negative value (−).

The difference between the times when the ranging frame from mobile node $N_M$ 112 is received by anchor node $N_A$ 104 and anchor node $N_B$ 106 may then be calculated. By considering TOF according to a distance between anchor node $N_A$ 104 and anchor node $N_B$ 106, which is $d_{AB}$ in FIG. 1, $n_{AB2}$ is calibrated with a local calibration time using $n_{B2}$ as a reference and adopted as the same reference time for anchor node $N_A$ 104 and anchor node $N_B$ 106, and the time taken to receive the ranging frame from the mobile node is calculated from Equation 6 using a counter value of the most recently local calibration time as a reference to calculate receiving time information $n_{AM3}$ and $n_{BM3}$ as shown in Equation 8 (step 708).

This receiving time information is used to calculate a difference of distance corresponding to the difference between the times when the ranging frame from mobile node $N_M$ 112 is received by two anchor node anchor node $N_A$ 104 and $N_B$ 106 according to Equation 9 (step 710).

A difference of distance corresponding to the difference between the times when the ranging frames from mobile node $N_M$ 112 are received by two anchor node $N_A$ 104 and $N_C$ 108 through the process as described above from the mobile node $N_M$ 112-anchor node $N_C$ 108-anchor node $N_A$ 104-location server 102 pair as shown in FIG. 5 is calculated from Equation 10, and a difference of distance corresponding to the difference between the times when the ranging frame from the mobile node $N_M$ 112 is received by two anchor node $N_A$ 104 and $N_D$ 110 through the process as described above from the mobile node $N_M$ 112-anchor node $N_D$ 110-anchor node $N_A$ 104-location server 102 pair as shown in FIG. 6 is calculated from Equation 11, which is repeatedly performed on the respective anchor-node pairs (step 712).

The position of the mobile node 112 is exactly estimated by applying the calculated difference of distance between each anchor-node pair and the mobile node 112 to the TDOA (step 714).

Thus, the location server can estimate frequency offsets of the anchor nodes by disposing a few anchor nodes in known positions in a wireless sensor network, obtain the difference between the times when ranging frame from a mobile node is received by two anchor nodes from the known distance between the nodes, and estimate the position of the mobile node using the TDOA.

While the invention has been shown and described with respect to the preferred embodiments, it will be understood by those skilled in the art that various changes and modifications may be made without departing from the spirit and scope of the invention as defined in the following claims.

The invention claimed is:

1. A method for estimating a position of a mobile node in a wireless sensor network including a plurality of anchor nodes, the method comprising:
   forming anchor-node pairs by using a location server and any one of the anchor nodes as a reference and connecting the other anchor nodes to the one anchor node;
   calculating a frequency tolerance based on time information and a clock frequency corresponding to each anchor-node pair;
   calibrating the time information based on the frequency tolerance and a distance between the nodes and calculating a difference between times when ranging frames from the mobile node are received by the nodes; and
   calculating a difference of distance corresponding to the calculated time difference and applying the difference of distance to Time Difference Of Arrival (TDOA) in order to estimate the position of the mobile node.

2. The method of claim 1, further comprising storing and managing, by the location server, the time information corresponding to the formed anchor-node pairs.

3. The method of claim 2, wherein the time information based on a clock frequency of the anchor node and of the mobile node are stored along with the time information of the location server.

4. The method of claim 1, further comprising calculating a time interval from the time information and the clock frequency to calculate the frequency tolerance.

5. The method of claim 4, wherein the time interval is calculated from a difference between results of a clock counter value multiplied by one clock period in which time information is received.

6. The method of claim 4, wherein the frequency tolerance is calculated from a difference between a counter value by a local clock and a counter value by a reference frequency clock of the location server, the anchor node, and the mobile node for the same time interval.

7. The method of claim 6, further comprising performing calibration with a local time between the anchor-node pairs using the time information obtained from a preceding transmission between the one of the anchor nodes and the another anchor node.

8. The method of claim 7, wherein the local time is calculated from Time of Flight (TOF) that depends on the distance between the nodes.

9. The method of claim 8, wherein the time difference is calculated by estimating a difference in ranging frame receiving times between two nodes using the time information, the frequency tolerance, and the distance between the nodes.

10. The method of claim 9, further comprising applying the frequency tolerance to the local time of each anchor-node pair to synchronize the local time with a reference frequency-based time, and estimating the difference between the ranging frame receiving times.

* * * * *